United States Patent
Zhao et al.

(10) Patent No.: US 8,619,617 B2
(45) Date of Patent: Dec. 31, 2013

(54) DATA TRANSMISSION METHOD, SYSTEM AND DEVICE IN MULTI-CARRIER SYSTEM

(75) Inventors: Yali Zhao, Beijing (CN); Guoqing Li, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/578,234

(22) PCT Filed: Jan. 30, 2011

(86) PCT No.: PCT/CN2011/070806
§ 371 (c)(1),
(2), (4) Date: Aug. 9, 2012

(87) PCT Pub. No.: WO2011/098012
PCT Pub. Date: Aug. 18, 2011

(65) Prior Publication Data
US 2012/0327877 A1    Dec. 27, 2012

(30) Foreign Application Priority Data
Feb. 11, 2010    (CN) .......................... 2010 1 0111878

(51) Int. Cl.
*H04L 12/28* (2006.01)
(52) U.S. Cl.
USPC ......................................................... 370/252
(58) Field of Classification Search
None
See application file for complete search history.

(56) References Cited

U.S. PATENT DOCUMENTS

2010/0208667 A1* 8/2010 Chun et al. ..................... 370/329
2010/0227569 A1* 9/2010 Bala et al. ....................... 455/73
2011/0105136 A1* 5/2011 Choi ........................... 455/452.1
2011/0107169 A1* 5/2011 Lohr et al. ..................... 714/748
2011/0117948 A1* 5/2011 Ishii et al. ..................... 455/509

FOREIGN PATENT DOCUMENTS

WO    WO-2009134196    11/2009
WO    WO-2009154839    12/2009

OTHER PUBLICATIONS

International Search Report for PCT International Application No. PCT/CN2011/070806 dated May 5, 2011 (including English translation).
International Preliminary Report on Patentability for for PCT International Application No. PCT/CN2011/070806 dated Aug. 14, 2012 (including English translation).
ZTE, Considerations on scheduling in carrier aggregation, 3GPP TSG RAN WG2 Meeting #66bis, R2-093886, Jul. 3, 2009, sections 2.1-2.2.
ZTE, Method for UL ACK/NACK resource allocation in LTE-A, 3GPP TSG-RAN WG1 #59bis, R1-100521, Jan. 22, 2010, sections 2-3.

* cited by examiner

*Primary Examiner* — Raj Jain
(74) *Attorney, Agent, or Firm* — Foley & Lardner LLP; James F. Ewing

(57) ABSTRACT

A data transmission method, system and device in multi-carrier system, which relate to wireless communication field, are provided for solving the problem, that is, when the scheduling methods for same time unit in the network side of multi-carrier system include Semi-Persistent Scheduling (SPS) and dynamic scheduling at the same time, how the terminal transmits data in said time unit. Before transmitting the uplink data by using the time unit, the terminal determines that the network side schedules the terminal to implement SPS uplink transmission and dynamic scheduling uplink transmission in the time unit by using the uplink component carrier and the number of uplink component carriers which can be used to implement uplink transmission by the terminal is more than one; the terminal selects parts or all of multiple available uplink component carriers, and implements SPS uplink transmission and/or dynamic scheduling uplink transmission in the time unit by using the selected uplink component carriers.

13 Claims, 1 Drawing Sheet

DATA TRANSMISSION METHOD, SYSTEM AND DEVICE IN MULTI-CARRIER SYSTEM

CROSS-REFERENCE TO RELATED APPLICATIONS

The present application is a US National Stage of International Application No. PCT/CN2011/070806, filed 30 Jan. 2011, designating the United States, and claiming priority to Chinese Patent Application No. 201010111878.4 filed 11 Feb. 2010 and entitled "Data Transmission Method, System and Device in Multi-Carrier System". The entire contents of the foregoing applications are hereby incorporated herein by reference.

This application claims priority of Chinese Patent Application No. 201010111878.4, filed with the State Intellectual Property Office of China on Feb. 11, 2010 and entitled "Data transmission method, system and device in multi-carrier system", which is hereby incorporated by reference in its entirety.

FIELD OF THE INVENTION

The present invention relates to the field of wireless communications and particularly to a data transmission method, system and device in a multi-carrier system.

BACKGROUND OF THE INVENTION

Significantly improved peak rates of 1 Gbps in the downlink and 500 Mbps in the uplink are required for a Long Term Evolution-Advanced (LTE-A) system as compared to a Long Term Evolution (LTE) system. Also good compatibility of the LTE-A system with the LTE system is required. The technology of Carrier Aggregation (CA) is introduced to the LTE-A system to accommodate the required improved peak rates, compatibility with the LTE system and full use of frequency resources.

The CA technology refers to presence of a plurality of Component Carriers (CCs) in both the uplink and the downlink in a cell instead of a mode in which there is only one pair of component carriers in the LTE system and earlier wireless communication systems. A base station (eNB) manages and schedules uniformly a plurality of sets of component carriers in the cell. The component carriers may be consecutive or inconsecutive, and the maximum bandwidth of each component carrier is 20 MHz for compatibility with the LTE system.

From the perspective of a User Equipment (UE), the user equipment can receive downlink data and scheduling information concurrently over a plurality of downlink component carriers and transmit uplink data and feedback information regarding downlink transmission over a plurality of uplink component carriers.

In the CA mechanism, common points of the downlink layer 2 and the upper layer 2 of the LTE-A system to those of the LTE system lie in the following points.

The Packet Data Convergence Protocol (PDCP) and the Radio Link Control (RLC) layer are the same in structure as those of the LTE system; and the Medium Access Control (MAC) layer function is the same as that of the LTE system and primarily performs scheduling, including priority and resource allocation, etc., on a user equipment.

Different points lie in the following points.

There is a separate Hybrid Automatic Repeat Request (HARM) entity for each component carrier; each component carrier corresponds to a separate transmission channel; and a Transport Block (TB) is organized separately for each component carrier, and no component carrier can be exchanged through retransmission.

Typically, a user equipment transmits uplink data and receives downlink data according to dynamical scheduling from the network side. As meant by dynamical scheduling, each time the user equipment is intended to transmit and receive data, dynamical scheduling signaling is transmitted from the network side to the user equipment over a Physical Downlink Control Channel (PDCCH), and the user equipment transmits and receives the data over a resource indicated in the dynamical scheduling signaling upon reception of the dynamical scheduling signaling.

In order to reduce an overhead of signaling, the LTE system introduces Semi-Persistent Scheduling (SPS) for a service with substantially the same size and a regular arrival interval of data packets and specifies that one user equipment can be configured with only one set of SPS resources.

Semi-persistent scheduling refers to a user equipment is configured with a period of semi-persistent scheduling and a Semi-Persistent Scheduling Cell Radio Network Temporary Identifier (SPS C-RNTI) in advance by the network side and semi-persistent scheduling signaling is transmitted to the user equipment from the network side, and the user equipment detects the semi-persistent scheduling signaling for the user equipment according to the configured SPS C-RNTI and then transmits and receives data over a resource indicated in the semi-persistent scheduling signaling at an interval of the configured period of semi-persistent scheduling.

The user equipment is configured with the period of semi-persistent scheduling and the used SPS C-RNTI by a Radio Resource Control (RRC) entity and the semi-persistent scheduling signaling is transmitted to the user equipment over a PDCCH.

There is only one component carrier of the LTE system, and without spatial multiplexing, a user equipment can transmit only one TB in a sub-frame, so if the user equipment receives dynamic PDCCH scheduling signaling of a sub-frame while there is an SPS resource allocation in the sub-frame, the user equipment can only transmit data in the sub-frame in response to an instruction in the dynamic scheduling signaling while disregarding the SPS resource allocation.

The inventors have identified during making of the invention the following technical problems in the prior art.

With the introduction of the CA mechanism, a user equipment can transmit data concurrently over a plurality of component carriers in a sub-frame, and at least one TB can be borne over each CC. In this case, if the user equipment is scheduled from the network side to perform uplink transmission including both SPS transmission and dynamical scheduling transmission in the sub-frame, a specific implementation has been absent so far to how the user equipment transmits data in the time unit in response to scheduling from the network side.

SUMMARY OF THE INVENTION

Embodiments of the invention provide a data transmission method in a multi-carrier system to address the problem of how a user equipment transmits data in the same time unit in response to scheduling from the network side in the multi-carrier system when scheduling for the time unit from the network side includes both SPS and dynamic scheduling.

A data transmission method in a multi-carrier system includes:

before transmission of uplink data in a time unit, determining, by a user equipment, that the user equipment is scheduled from the network side to perform Semi-Persistent Scheduling, SPS, uplink transmission in the time unit over an uplink component carrier and that the user equipment is further scheduled from the network side to perform dynamic scheduling uplink transmission in the time unit over an uplink component carrier, wherein there are a plurality of uplink component carriers available to the user equipment performing uplink transmission; and selecting, by the user equipment, all or a part of uplink component carriers among the plurality of available uplink component carriers and performing SPS uplink transmission and/or dynamic scheduling uplink transmission in the time unit over the respective selected uplink component carriers.

A user equipment includes:

a determining unit configured, before transmission of uplink data in a time unit, to determine that the user equipment is scheduled from the network side to perform Semi-Persistent Scheduling (SPS) uplink transmission in the time unit over an uplink component carrier and that the user equipment is further scheduled from the network side to perform dynamic scheduling uplink transmission in the time unit over an uplink component carrier, wherein there are a plurality of uplink component carriers available to the user equipment performing uplink transmission; and a transmitting unit configured to select all or a part of uplink component carriers among the plurality of available uplink component carriers and perform SPS uplink transmission and/or dynamic scheduling uplink transmission in the time unit over the respective selected uplink component carriers.

In the invention, before transmission of uplink data in a time unit, if a user equipment determines that the user equipment is scheduled from the network side to perform dynamic scheduling uplink transmission in the time unit over an uplink component carrier and the user equipment is further scheduled from the network side to perform SPS uplink transmission in the time unit over an uplink component carrier, and there are a plurality of uplink component carriers available to the user equipment performing uplink transmission in response to scheduling from the network side, the user equipment selects all or a part of uplink component carriers among the plurality of available uplink component carriers, and for each of the selected uplink component carriers, the user equipment performs SPS uplink transmission and/or dynamic scheduling uplink transmission in the time unit over the uplink component carrier in response to scheduling from the network side. As can be apparent, the invention addresses the problem of how the user equipment transmits data in the same time unit in response to scheduling from the network side in a multi-carrier system when scheduling for the time unit from the network side includes both SPS and dynamic scheduling.

DETAILED DESCRIPTION OF THE EMBODIMENTS

In order to address the problem of how a user equipment transmits data in a time unit in response to scheduling from the network side in a multi-carrier system, an embodiment of the invention provides a data transmission method in a multi-carrier system. In this method, when scheduling for the same time unit from the network side includes both SPS and dynamic scheduling, a user equipment can select an uplink CC used for uplink transmission according to a specific policy and performs SPS uplink transmission and/or dynamic scheduling uplink transmission over the selected uplink CC. The time unit refers to a sub-frame.

Figure 1:
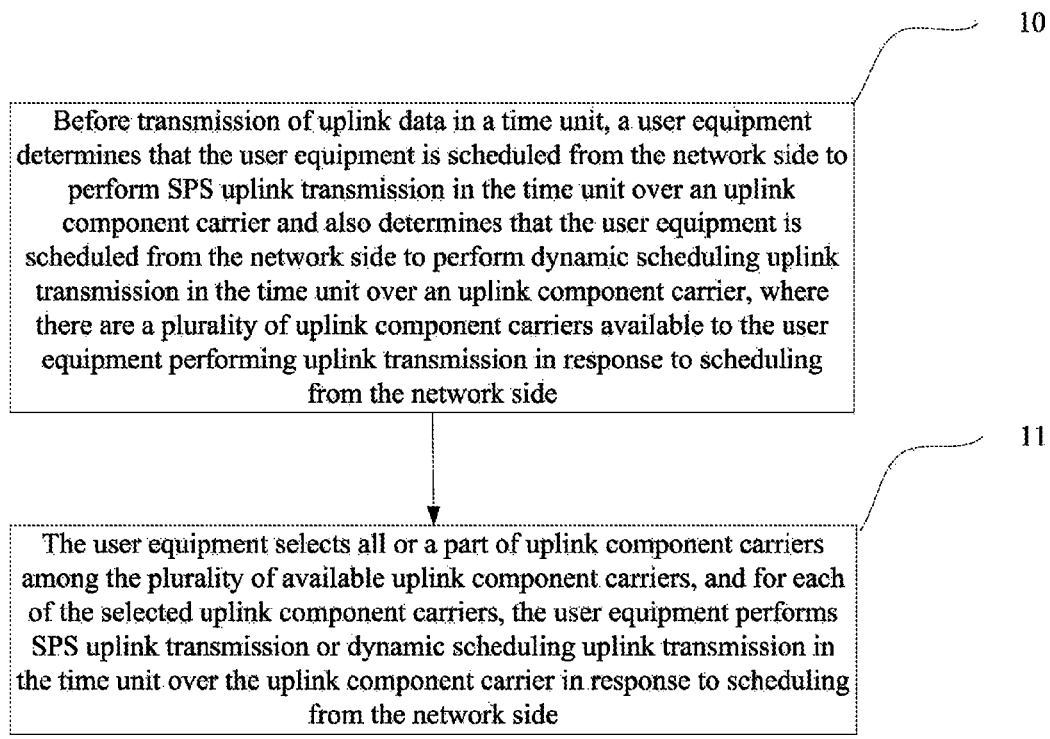
FIG. 1 is a schematic flow chart of a data transmission method in a multi-carrier system according to an embodiment of the invention.

Referring to FIG. 1, a data transmission method in a multi-carrier system according to an embodiment of the invention includes the following steps.

Step 10: Before transmission of uplink data in a time unit, a user equipment determines that the user equipment is scheduled from the network side to perform SPS uplink transmission in the time unit over an uplink component carrier and also determines that the user equipment is scheduled from the network side to perform dynamic scheduling uplink transmission in the time unit over an uplink component carrier, where there are a plurality of uplink component carriers available to the user equipment performing uplink transmission in response to scheduling from the network side.

Step 11: The user equipment selects all or a part of uplink component carriers among the plurality of available uplink component carriers, and for each of the selected uplink component carriers, the user equipment performs SPS uplink transmission and/or dynamic scheduling uplink transmission in the time unit over the uplink component carrier in response to scheduling from the network side.

In the step 10, a user equipment determines that the user equipment is scheduled from the network side to perform dynamic scheduling uplink transmission in a time unit over an uplink component carrier upon reception of dynamic scheduling signaling transmitted from the network side to instruct the user equipment to perform uplink transmission in the time unit over the uplink component carrier; and the user equipment determines that the user equipment is further scheduled from the network side to perform SPS uplink transmission in the time unit over an uplink component carrier after the user equipment is configured with an SPS uplink transmission resource including the time unit from the network side. This is performed in the following two approaches.

In a first approach, the user equipment determines whether the user equipment is configured with an SPS uplink transmission resource including the time unit from the network side upon reception of dynamic scheduling signaling transmitted from the network side to instruct the user equipment to perform uplink transmission in the time unit over an uplink component carrier, and if so, the user equipment determines that the user equipment is scheduled from the network side to perform SPS uplink transmission in the time unit over the uplink component carrier and determines that the user equipment is scheduled from the network side to perform dynamic scheduling uplink transmission in the time unit over the uplink component carrier.

In a second approach, upon reception of information of an SPS uplink transmission resource, including the time unit, configured for the user equipment from the network side, the user equipment determines respectively whether dynamic scheduling signaling transmitted from the network side for each time unit with a valid SPS resource allocation and to instruct the user equipment to perform uplink transmission in the time unit over an uplink component carrier is received in the time unit, and if so, the user equipment determines that the user equipment is scheduled from the network side to perform dynamic scheduling uplink transmission in the time unit over the uplink component carrier and determines the user equipment is scheduled from the network side to perform SPS uplink transmission in the time unit over the uplink component carrier.

Of course, the user equipment can alternatively perform the foregoing step 10 at any other time before transmission of uplink data in the time unit.

In the step 10, the use equipment determines according to scheduling from the network side the number of uplink component carriers available to the user equipment performing uplink transmission as follows:

before transmission of uplink data in the time unit, the user equipment determines uplink component carriers for which respective dynamical scheduling signaling is received to instruct the user equipment to perform uplink transmission in the time unit over the uplink component carriers, and before transmission of uplink data in the time unit, the user equipment determines uplink component carriers for which SPS uplink transmission resources including the time unit are configured for the user equipment from the network side, and takes an collection of both, and the number of uplink component carriers included in the collection is the number of uplink component carriers available to the user equipment scheduled from the network side to perform uplink transmission.

In the step 11, the user equipment performing SPS uplink transmission in the time unit over the uplink component carrier refers to the user equipment transmitting the uplink data by a priority of the current uplink data to be transmitted in the time unit periodically over the uplink component carrier over a configured SPS uplink transmission resource. The user equipment performing dynamic scheduling uplink transmission in the time unit over the uplink component carrier refers to the user equipment transmitting uplink data in the time unit over the uplink component carrier in response to the instruction of the received dynamic scheduling signaling. This step can be performed in a variety of approaches to be described below by way of an example.

EXAMPLE 1

The user equipment selects all of uplink component carriers among the plurality of available uplink component carriers, and for each of the selected uplink component carriers, if the user equipment is scheduled from the network side to perform both dynamic scheduling uplink transmission and SPS uplink transmission in the time unit over the uplink component carrier, the user equipment performs only dynamic scheduling uplink transmission but no SPS uplink transmission in the time unit over the uplink component carrier; if the user equipment is scheduled from the network side to perform only dynamic scheduling uplink transmission in the time unit over the uplink component carrier, the user equipment performs only dynamic scheduling uplink transmission but no SPS uplink transmission in the time unit over the uplink component carrier; and if the user equipment is scheduled from the network side to perform only SPS uplink transmission in the time unit over the uplink component carrier, the user equipment performs only SPS uplink transmission but no dynamic scheduling uplink transmission in the time unit over the uplink component carrier. In this example, dynamic scheduling over a CC can not take the place of SPS scheduling over another CC, and only dynamic scheduling over the same CC can take the place of SPS scheduling over the CC.

EXAMPLE 2

The user equipment selects all of uplink component carriers among the plurality of available uplink component carriers, and for each of the selected uplink component carriers, if the user equipment is scheduled from the network side to perform both dynamic scheduling uplink transmission and SPS uplink transmission in the time unit over the uplink component carrier, the user equipment performs only SPS uplink transmission but no dynamic scheduling uplink transmission in the time unit over the uplink component carrier; if the user equipment is scheduled from the network side to perform only dynamic scheduling uplink transmission in the time unit over the uplink component carrier, the user equipment performs only dynamic scheduling uplink transmission but no SPS uplink transmission in the time unit over the uplink component carrier; and if the user equipment is scheduled from the network side to perform only SPS uplink transmission in the time unit over the uplink component carrier, the user equipment performs only SPS uplink transmission but no dynamic scheduling uplink transmission in the time unit over the uplink component carrier. In this example, dynamic scheduling over a CC can not take the place of SPS scheduling over the same CC.

EXAMPLE 3

The user equipment selects from the plurality of available uplink component carriers those uplink component carriers satisfying the condition that the uplink component carriers are scheduled from the network side for dynamic scheduling uplink transmission in the time unit. For each of the selected uplink component carriers, the user equipment performs only dynamic scheduling uplink transmission but no SPS uplink transmission over the time unit over the uplink component carrier. In this example, dynamic scheduling over a CC can take place of SPS scheduling over another CC.

EXAMPLE 4

The user equipment selects from the plurality of available uplink component carriers those uplink component carriers satisfying the condition that the uplink component carriers are scheduled from the network side for SPS uplink transmission in the time unit. For each of the selected uplink component carriers, the user equipment performs only SPS uplink transmission but no dynamic scheduling uplink transmission over the time unit over the uplink component carrier.

The time unit in the invention can be a sub-frame.

The invention will be described below in details.

The invention proposes a method for dealing with a relationship between dynamic scheduling and SPS scheduling if both dynamic scheduling and SPS scheduling take place in the same sub-frame for the same user equipment in a multi-carrier system. This method is particularly as follows.

If there are both an SPS resource allocation and a dynamic scheduling resource allocation over the same CC, data is transmitted only according to the dynamic scheduling resource allocation while disregarding the SPS resource allocation. If there are both an SPS resource allocation and a dynamic scheduling resource allocation over different CCs, the user equipment performs dynamic scheduling data transmission over the CC with only dynamic scheduling and SPS data transmission over the CC with only the SPS resource allocation.

Assumed a user equipment is configured with three uplink component carriers numbered respectively CC1, CC2 and CC3 in a multi-carrier system, and there are the following embodiments.

First Embodiment:

In this embodiment, a base station configures the user equipment with an SPS uplink transmission resource including a sub-frame I over the CC1, and the user equipment parses a PDCCH for dynamic scheduling signaling to schedule the user equipment to transmit data in the sub-frame I over the carrier CC1, and then the user equipment transmits data in the sub-frame I in response to an instruction of the dynamic scheduling signaling in the method provided above for dealing with a relationship between dynamic scheduling and SPS scheduling in the case that both dynamic scheduling and SPS scheduling take place in the same sub-frame particularly as follows.

Step S01: The base station configures the user equipment with a period T of semi-persistent scheduling and an SPS C-RNTI for the CC1.

Step S02: The base station transmits a PDCCH including the SPS C-RNTI to the user equipment and allocates a physical resource used for SPS transmission over the CC1, and the user equipment stores the time at which the PDCCH is transmitted, the SPS resource indicated in SPS and other information.

Step S03: The base station transmits dynamic scheduling signaling to the user equipment to instruct the user equipment to perform uplink transmission in the sub-frame I over the CC1, and the user equipment determines from the previously stored SPS-related information that there is SPS transmission in the sub-frame I over the CC1.

Step S04: The user equipment performs uplink transmission in the sub-frame I over the CC1 in response to the instruction of the dynamic scheduling signaling in the method provided above for dealing with a relationship between dynamic scheduling and SPS scheduling in the case that both dynamic scheduling and SPS scheduling take place in the same sub-frame upon reception of the dynamic scheduling signaling.

Second Embodiment:

In this embodiment, a base station configures the user equipment with an SPS uplink transmission resource including a sub-frame I over the CC1, and the user equipment parses a PDCCH for dynamic scheduling signaling to schedule the user equipment to transmit data in the sub-frame I over the carrier CC2, and then the user equipment can transmit data in the sub-frame I over the CC1 over the configured SPS uplink transmission resource and transmit data in the sub-frame I over the CC2 in response to an instruction of the dynamic scheduling signaling in the method provided above for dealing with a relationship between dynamic scheduling and SPS scheduling in the case that both dynamic scheduling and SPS scheduling take place in the same sub-frame particularly as follows.

Step S21: The base station configures the user equipment with a period T of semi-persistent scheduling and an SPS C-RNTI for the CC1.

Step S22: The base station transmits a PDCCH including the SPS C-RNTI to the user equipment and allocates a physical resource used for SPS transmission over the CC1, and the user equipment stores the time at which the PDCCH is transmitted, the SPS resource indicated by the PDCCH and other information.

Step S23: The base station transmits dynamic scheduling signaling to the user equipment to instruct the user equipment to perform uplink transmission in the sub-frame I over the CC2, and the user equipment determines from the SPS-related information stored in the step S22 that there is SPS transmission in the sub-frame I over the CC1.

Step S24: The user equipment transmits data in the sub-frame I over the CC1 over the configured SPS uplink transmission resource and performs uplink transmission in the sub-frame I over the CC2 in response to the instruction of the dynamic scheduling signaling in the method provided above for dealing with a relationship between dynamic scheduling and SPS scheduling in the case that both dynamic scheduling and SPS scheduling take place in the same sub-frame upon reception of the dynamic scheduling signaling.

Third Embodiment:

In this embodiment, a base station configures the user equipment with an SPS uplink transmission resource including a sub-frame I over the CC1 and the CC3, and the user equipment parses a PDCCH for dynamic scheduling signaling to schedule the user equipment to transmit data in the sub-frame I over the carrier CC2, and then the user equipment can transmit data in the sub-frame I over the CC1 and the CC3 over the configured SPS uplink transmission resource and transmit data in the sub-frame I over the CC2 in response to an instruction of the dynamic scheduling signaling in the method provided above for dealing with a relationship between dynamic scheduling and SPS scheduling in the case that both dynamic scheduling and SPS scheduling take place in the same sub-frame particularly as follows.

Step S31: The base station configures the user equipment with periods T of semi-persistent scheduling and SPS C-RNTIs for the CC1 and the CC3.

Step S32: The base station transmits PDCCHs including the SPS C-RNTIs for SPS transmission over the CC1 and the CC3 respectively to the user equipment and allocates physical resources used for SPS transmission over the CC1 and the CC3, and the user equipment stores the times at which the PDCCHs are transmitted, the SPS resources allocated by the PDCCHs and other information.

Step S33: The base station transmits dynamic scheduling signaling to the user equipment to instruct the user equipment to perform uplink transmission in the sub-frame I over the CC2, and the user equipment determines from the previously stored SPS-related information that there is SPS transmission in the sub-frame I over the CC1 and the CC3.

Step 34: The user equipment transmits data in the sub-frame I over the CC1 and the CC3 over the configured SPS uplink transmission resources and performs uplink transmission in the sub-frame I over the CC2 in response to the instruction of the dynamic scheduling signaling in the method provided above for dealing with a relationship between dynamic scheduling and SPS scheduling in the case that both dynamic scheduling and SPS scheduling take place in the same sub-frame upon reception of the dynamic scheduling signaling.

Based upon the same inventive concept, an embodiment of the invention further provides a user equipment, and since the user equipment addresses the problem under a similar principle to the data transmission method in a multi-carrier system, reference can be made to the implementation of the method for an implementation of the use equipment, and a repeated description thereof will be omitted here.

Figure 2:
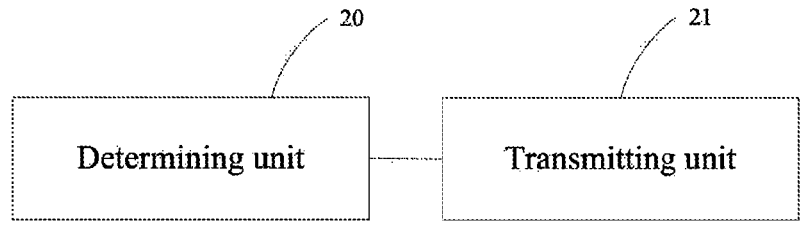
FIG. 2 is a schematic structural diagram of a data transmission device in a multi-carrier system according to an embodiment of the invention.

Referring to FIG. 2, an embodiment of the invention further provides a user equipment including:

a determining unit 20 configured, before transmission of uplink data in a time unit, to determine that the user equipment is scheduled from the network side to perform dynamic scheduling uplink transmission in the time unit over an uplink component carrier and also determine that the user equipment is scheduled from the network side to perform SPS uplink transmission in the time unit over an uplink component carrier, where there are a plurality of uplink component carriers available to the user equipment performing uplink transmission in response to scheduling from the network side; and a transmitting unit 21 configured to select all or a part of uplink component carriers among the plurality of available uplink component carriers, and for each of the selected uplink component carriers, to perform SPS uplink transmission and/or dynamic scheduling uplink transmission in the time unit over the uplink component carrier in response to scheduling from the network side.

The determining unit 20 is configured to determine that the user equipment is scheduled from the network side to perform SPS uplink transmission in the time unit over an uplink component carrier upon judging that the user equipment is configured with an SPS uplink transmission resource including the time unit from the network side; and to determine that the user equipment is scheduled from the network side to perform dynamic scheduling uplink transmission in the time unit over an uplink component carrier if dynamic scheduling signaling transmitted from the network side is received to instruct the user equipment to perform uplink transmission in the time unit over the uplink component carrier.

Particularly, it is determined whether the user equipment is configured with an SPS uplink transmission resource including the time unit from the network side upon reception of dynamic scheduling signaling transmitted from the network side to instruct the user equipment to perform uplink transmission in the time unit over an uplink component carrier, and if so, it is determined that the user equipment is scheduled from the network side to perform dynamic scheduling uplink transmission in the time unit over the uplink component carrier and the user equipment is further scheduled from the network side to perform SPS uplink transmission in the time unit over the uplink component carrier; or upon reception of information of an SPS uplink transmission resource, including the time unit, configured for the user equipment from the network side, it is determined whether dynamic scheduling signaling transmitted from the network side to instruct the user equipment to perform uplink transmission in the time unit over an uplink component carrier is received in a set period of time, and if so, it is determined that the user equipment is scheduled from the network side to perform dynamic scheduling uplink transmission in the time unit over the uplink component carrier and the user equipment is further scheduled from the network side to perform SPS uplink transmission in the time unit over the uplink component carrier.

The transmitting unit 21 is configured to select all of uplink component carriers among the plurality of available uplink component carriers; and for each of the selected uplink component carriers, if the user equipment is scheduled from the network side to perform both dynamic scheduling uplink transmission and SPS uplink transmission in the time unit over the uplink component carrier, to perform only dynamic scheduling uplink transmission in the time unit over the uplink component carrier; if the user equipment is scheduled from the network side to perform only dynamic scheduling uplink transmission in the time unit over the uplink component carrier, to perform only dynamic scheduling uplink transmission in the time unit over the uplink component carrier; and if the user equipment is scheduled from the network side to perform only SPS uplink transmission in the time unit over the uplink component carrier, to perform only SPS uplink transmission in the time unit over the uplink component carrier.

The transmitting unit 21 is configured to select from the plurality of available uplink component carriers those uplink component carriers satisfying the condition that the user equipment is scheduled from the network side to perform dynamic scheduling uplink transmission in the time unit over the uplink component carriers; and for each of the selected uplink component carriers, to perform only dynamic scheduling uplink transmission over the time unit over the uplink component carrier.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

In summary, advantageous effects of the invention include:

in the solution according to the embodiments of the invention, before transmission of uplink data in a time unit, if a user equipment determines that the user equipment is scheduled from the network side to perform dynamic scheduling uplink transmission in the time unit over an uplink component carrier and at the same time the user equipment is further scheduled from the network side to perform SPS uplink transmission in the time unit over an uplink component carrier, where there are a plurality of uplink component carriers available to the user equipment performing uplink transmission in response to scheduling from the network side, the user equipment selects all or a part of uplink component carriers among the plurality of available uplink component carriers, and for each of the selected uplink component carriers, the user equipment performs SPS uplink transmission and/or dynamic scheduling uplink transmission in the time unit over the uplink component carrier in response to scheduling from the network side. As can be apparent, the invention addresses the problem of how the user equipment transmits data in the same time unit in response to scheduling from the network side in a multi-carrier system when scheduling for the time unit from the network side includes both SPS and dynamic scheduling, that is, addresses the new problem resulting from an increasing number of component carriers in the multi-carrier system.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A data transmission method in a multi-carrier system, comprising:
   before transmission of uplink data in a time unit, determining, by a user equipment, that the user equipment is scheduled from the network side to perform Semi-Persistent Scheduling, SPS, uplink transmission in the time unit over an uplink component carrier and also determining that the user equipment is scheduled from the network side to perform dynamic scheduling uplink transmission in the time unit over an uplink component carrier, wherein there are a plurality of uplink component carriers available to the user equipment performing uplink transmission; and
   selecting, by the user equipment, all or a part of uplink component carriers among the plurality of available uplink component carriers and performing SPS uplink transmission and/or dynamic scheduling uplink transmission in the time unit over the respective selected uplink component carriers, wherein performing SPS uplink transmission and/or dynamic scheduling uplink transmission in the time unit over the respective selected uplink component carriers comprises:
      if the user equipment has both dynamic scheduling uplink transmission and SPS uplink transmission in the time unit over a selected uplink component carrier, the user equipment performing only dynamic scheduling uplink transmission in the time unit over the selected uplink component carrier;
      if the user equipment has only dynamic scheduling uplink transmission in the time unit over a selected uplink component carrier, the user equipment performing only dynamic scheduling uplink transmission in the time unit over the selected uplink component carrier; and
      if the user equipment has only SPS uplink transmission in the time unit over a selected uplink component carrier, the user equipment performing only SPS uplink transmission in the time unit over the selected uplink component carrier.

2. The method according to claim 1, wherein the uplink component carrier used for the SPS uplink transmission scheduled from the network side to be performed by the user equipment and the uplink component carrier used for the dynamic scheduling uplink transmission scheduled from the network side to be performed by the user equipment are the same uplink component carrier or different uplink component carriers.

3. The method according to claim 2, wherein selecting by the user equipment uplink component carriers comprises:
   selecting, by the user equipment, from the plurality of available uplink component carriers those uplink component carriers over which the user equipment is scheduled from the network side to perform dynamic scheduling uplink transmission and/or SPS uplink transmission in the time unit.

4. The method according to claim 2, wherein the time unit is a sub-frame.

5. The method according to claim 1, wherein determining that the user equipment is scheduled from the network side to perform SPS uplink transmission comprises:
   determining, by the user equipment, that the user equipment is scheduled from the network side to perform SPS uplink transmission in the time unit over an uplink component carrier when the user equipment is configured with an SPS uplink transmission resource including the time unit from the network side; and
   determining that the user equipment is scheduled from the network side to perform dynamic scheduling uplink transmission comprises:
   determining, by the user equipment, that the user equipment is scheduled from the network side to perform dynamic scheduling uplink transmission in the time unit over an uplink component carrier upon reception of dynamic scheduling signaling transmitted from the network side to instruct the user equipment to perform uplink transmission in the time unit over the uplink component carrier.

6. The method according to claim 5, wherein selecting by the user equipment uplink component carriers comprises:
   selecting, by the user equipment, from the plurality of available uplink component carriers those uplink component carriers over which the user equipment is scheduled from the network side to perform dynamic scheduling uplink transmission and/or SPS uplink transmission in the time unit.

7. The method according to claim 5, wherein the time unit is a sub-frame.

8. The method according to claim 1, wherein selecting by the user equipment uplink component carriers comprises:
   selecting, by the user equipment, from the plurality of available uplink component carriers those uplink component carriers over which the user equipment is scheduled from the network side to perform dynamic scheduling uplink transmission and/or SPS uplink transmission in the time unit.

9. The method according to claim 1, wherein the time unit is a sub-frame.

10. A user equipment, comprising:
    a determining unit configured, before transmission of uplink data in a time unit, to determine that the user equipment is scheduled from the network side to perform Semi-Persistent Scheduling, SPS, uplink transmission in the time unit over an uplink component carrier and also determine that the user equipment is scheduled from the network side to perform dynamic scheduling uplink transmission in the time unit over an uplink component carrier, wherein there are a plurality of uplink component carriers available to the user equipment performing uplink transmission; and a transmitting unit configured to select all or a part of uplink component carriers among the plurality of available uplink component carriers and perform SPS uplink transmission and/or dynamic scheduling uplink transmission in the time unit over the respective selected uplink component carriers, wherein the transmitting unit is further configured:

if the user equipment has both dynamic scheduling uplink transmission and SPS uplink transmission in the time unit over a selected uplink component carrier, to perform only dynamic scheduling uplink transmission in the time unit over the selected uplink component carrier;

if the user equipment has only dynamic scheduling uplink transmission in the time unit over a selected uplink component carrier, to perform only dynamic scheduling uplink transmission in the time unit over the selected uplink component carrier; and if the user equipment has only SPS uplink transmission in the time unit over a selected uplink component carrier, to perform only SPS uplink transmission in the time unit over the selected uplink component carrier.

11. The user equipment according to claim 10, wherein the determining unit is configured to determine that the user equipment is scheduled from the network side to perform SPS uplink transmission in the time unit over an uplink component carrier when the user equipment is configured with an SPS uplink transmission resource including the time unit from the network side; and to determine that the user equipment is scheduled from the network side to perform dynamic scheduling uplink transmission in the time unit over an uplink component carrier upon reception of dynamic scheduling signaling transmitted from the network side to instruct the user equipment to perform uplink transmission in the time unit over the uplink component carrier.

12. The user equipment according to claim 11, wherein the transmitting unit is configured to select from the plurality of available uplink component carriers those uplink component carriers over which the user equipment is scheduled from the network side to perform dynamic scheduling uplink transmission and/or SPS uplink transmission in the time unit.

13. The user equipment according to claim 10, wherein the transmitting unit is configured to select from the plurality of available uplink component carriers those uplink component carriers over which the user equipment is scheduled from the network side to perform dynamic scheduling uplink transmission and/or SPS uplink transmission in the time unit.

* * * * *